(12) United States Patent
Miyamoto et al.

(10) Patent No.: US 7,991,486 B2
(45) Date of Patent: Aug. 2, 2011

(54) PROCESS CONTROL APPARATUS REJECTING DISTURBANCE APPLIED TO FEEDBACK LOOP

(75) Inventors: Hiroyuki Miyamoto, Musashino (JP); Takashi Sasaki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 250 days.

(21) Appl. No.: 12/031,185

(22) Filed: Feb. 14, 2008

(65) Prior Publication Data

US 2008/0200996 A1 Aug. 21, 2008

(30) Foreign Application Priority Data

Feb. 15, 2007 (JP) ................... 2007-034609

(51) Int. Cl.
G05B 13/02 (2006.01)
(52) U.S. Cl. .................. 700/28; 700/7; 700/31; 700/55; 700/67; 700/128
(58) Field of Classification Search .................. 700/28, 700/31, 7, 54, 55, 122, 127
See application file for complete search history.

(56) References Cited

U.S. PATENT DOCUMENTS

| 4,719,561 | A | * | 1/1988 | Shigemasa | ...................... 700/28 |
| 4,910,688 | A | * | 3/1990 | Amini | .............................. 702/33 |
| 4,965,736 | A | * | 10/1990 | Balakrishnan | ................. 700/129 |
| 6,590,358 | B1 | * | 7/2003 | Tsutsui | .......................... 318/560 |

FOREIGN PATENT DOCUMENTS

| JP | 61-045312 A | 3/1986 |
| JP | 3-25901 U | 3/1991 |
| JP | 04-010101 | 1/1992 |
| JP | 07-020906 A | 1/1995 |
| JP | 11-305802 A | 11/1999 |
| JP | 2001-222303 A | 8/2001 |
| JP | 2004-303086 A | 10/2004 |
| JP | 2005-273634 A | 10/2005 |

OTHER PUBLICATIONS

Valenzuela, M. Anibal et al., "Improved Coordinated Response and Disturbance Rejection in the Critical Sections of Paper Machines", Conference Record of the 2006 IEEE IAS Pulp and Paper Conference.*
K.W. Lim et al. "Self-tuning control in the presence of periodic disturbance", Mar. 1989, IEE Proceedings, vol. 136, Pt. D, No. 2, pp. 98-104.*
Landau et al., "Adaptive narrow band disturbance rejection applied to an active suspension—an internal model principle approach," Automatica, 41 (2005) 563-574.
Japanese Office Action dated Apr. 19, 2011, corresponding to Japanese Patent Application No. 2007-034609.

* cited by examiner

*Primary Examiner* — Paul L Rodriguez
*Assistant Examiner* — Nathan Laughlin
(74) *Attorney, Agent, or Firm* — Sughrue Mion, PLLC

(57) ABSTRACT

A process control apparatus for controlling a control target includes, but is not limited to, first and second control units. The first control unit is designed in a design environment unspecifying any period of disturbance. The first control unit performs a feedback control to the control target by using a setting value of the control target and a measured value of the control target. The first control unit is included in a feedback loop. The second control unit is also included in the feedback loop. The second control unit is designed by using an internal model principle. The second control unit rejects the disturbance, which is applied to the feedback loop, by using the measured value of the control target.

6 Claims, 10 Drawing Sheets

PROCESS CONTROL APPARATUS REJECTING DISTURBANCE APPLIED TO FEEDBACK LOOP

BACKGROUND OF THE INVENTION

1. Field of the Invention

The present invention generally relates to a process control apparatus that controls a control target.

Priority is claimed on Japanese Patent Application No. 2007-34609, filed Feb. 15, 2007, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In general, the process control apparatus controls a control target so that a measured value of the control target follows a predetermined value. The process control apparatus includes a control unit that controls the control target. In general, the control unit can be designed so that the measured value of the control target follows a predetermined value in the environment that the period of the disturbance is not specified. The conventional process control apparatus does control without consideration of periodic disturbance.

Automatica 2005, vol. 41, 4 pp. 563-574, I. D. Landau, A. Constantinescu, D. Rey, "Adaptive narrow band disturbance rejection applied to an active suspension—an internal model principle approach" discloses a method for designing the control unit using the internal model principle in order to reject the influence of the disturbance from the measured value.

FIG. 10 is a block diagram illustrating the configuration of a conventional process control apparatus. The conventional process control apparatus includes a control unit 100 that is designed using a PID control method. The control unit 100 controls a control target 200.

As show in FIG. 10, a setting value "r" and a measured value "y" of the control target 200 are input into a first summing point 101. The first summing point 101 generates as error signal "e" that represents the difference between the setting value "r" and the measured value "y". The error signal "e" is input into the control unit 100. The control unit 100 generates the manipulated value "u" based on the error signal "e". The manipulated value "u" does not include any operation amount that is to reject a periodical disturbance "p". The manipulated value "u" and the periodical disturbance "p" are input into a second summing point 102. The manipulated value "u" and the periodical disturbance "p" are summed by the second summing point 102. The sum of the manipulated value "u" and the periodical disturbance "p" are input into the control target 200 so as to control the control target 200.

Japanese Patent No. 2982209 and Japanese Unexamined Patent Application, First Publications, Nos. 2004-303086 and 2005-273634 disclose conventional techniques using fuzzy control for rejecting periodical disturbances.

In accordance with the conventional process control apparatus, when the control unit, which is designed in the environment that the period of the disturbance is not specified, is incapable of rejecting the disturbance, thereby deteriorating the control performance of the control unit. The control unit, which is designed in the above-described method proposed by I. D. Landau, et al., is capable of rejecting the disturbance.

A feedback loop L needs to be reconfigured to provide the control unit that is capable of rejecting the disturbance.

After the control unit that is capable of rejecting tile disturbance is provided and the feedback loop L is reconfigured, it is necessary for no need to reject disturbance to replace the control unit that is capable of rejecting the disturbance into other control unit that is designed in the circumstance that the period of the disturbance is not specified. The replacement of the control unit still needs to reconfigure the feedback loop L. In other words, switching on or off the disturbance rejection needs reconfiguration of the feedback loop L. It is necessary to stop operations of the control unit 100 and the control target 200 every time the feedback loop L is reconfigured for replacing the control unit.

The process control apparatus designed in accordance with the conventional method proposed by I. D. Landau, et al., is capable of rejecting the disturbance by an appropriate control when the periodical disturbance has a narrow frequency distribution. If the frequency distribution of the periodical disturbance is wide, the waterbed effect of frequency characteristic is caused. In this case, the control unit that is designed to reject the disturbance in a limited frequency band may emphasize the disturbance in the other frequency band.

In view of the above, it will be apparent to those skilled in the art from this disclosure that there exists a need for an improved process control apparatus. This invention addresses this need in the art as well as other needs, which will become apparent to those skilled in the art from this disclosure.

SUMMARY OF THE INVENTION

Accordingly, it is a primary object of the present invention to provide a process control apparatus.

It is another object of the present invention to provide a process control apparatus free from any problems described above.

It is a further object of the present invention to provide a process control apparatus that is capable of rejecting the disturbance efficiently without reconfiguration of the feedback loop.

In accordance with a first aspect of the present invention, a process control apparatus for controlling a control target may include, but is not limited to, first and second control units. The first control unit is designed in a design environment unspecifying any period of disturbance. The first control unit performs a feedback control to the control target by using a setting value of the control target and a measured value of the control target. The first control unit is included in a feedback loop. The second control unit is added to the feedback loop. The second control unit is designed by using an internal model principle. The second control unit rejects the disturbance, which is applied to the feedback loop, by using the measured value of the control target.

In some cases, the second control unit may be designed to reject at least one main frequency component of frequency components of the disturbance, which is applied to the feedback loop.

In some cases, the second control unit may set an attenuation coefficient for each of the at least one main frequency component separately. The attenuation coefficient is to avoid excess increase of other frequency components than the at least one main frequency component.

The process control apparatus may further include a control parameter updating unit that updates at least one control parameter of the second control unit in accordance with variation of the at least one main frequency component of the measured value of the control target.

In some cases, the control parameter updating unit may further include, but is not limited to, an analyzer, a storage unit, a determination unit and an updating unit. The analyzer performs a frequency analysis of the measured value of the control target and generates a result of the frequency analysis. The storage unit stores the result of the frequency analysis. The determination unit compares a new result of the frequency analysis generated by the analyzer to a previous result of the frequency analysis that is stored in the storage unit. The determination unit determines the presence or absence of variation of the at least one main frequency component. The updating unit is configured to update the at least one control parameter of the second control unit in accordance with the new result of the frequency analysis, when the determination unit determines the presence or absence of variation of the at least one main frequency component.

In some cases, the control target may include a manufacture apparatus that produces a sheet product and the process control apparatus controls the control target by using a result of the measurement of the sheet product so that the profile in cross direction of the sheet product approaches a predetermined profile.

The process control apparatus may include the plug-in disturbance-rejection controller as the second control unit that is designed using the internal model principle. The plug-in disturbance-rejection controller as the second control unit is added into the feedback loop that includes the control unit, thereby rejecting the disturbance efficiently. The attenuation coefficient is introduced to design the plug-in disturbance-rejection controller, thereby suppressing the water-bed effects.

Separating the plug-in disturbance-rejection controller from the process control apparatus can realize the closed loop system of the process control apparatus that is constructed in the absence of disturbance before the plug-in disturbance-rejection controller is introduced. There is no need to re-configure the feedback loop in order to switch on or off the disturbance rejection control if necessary.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which from a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Process Control Apparatus

First Embodiment

Figure 1:
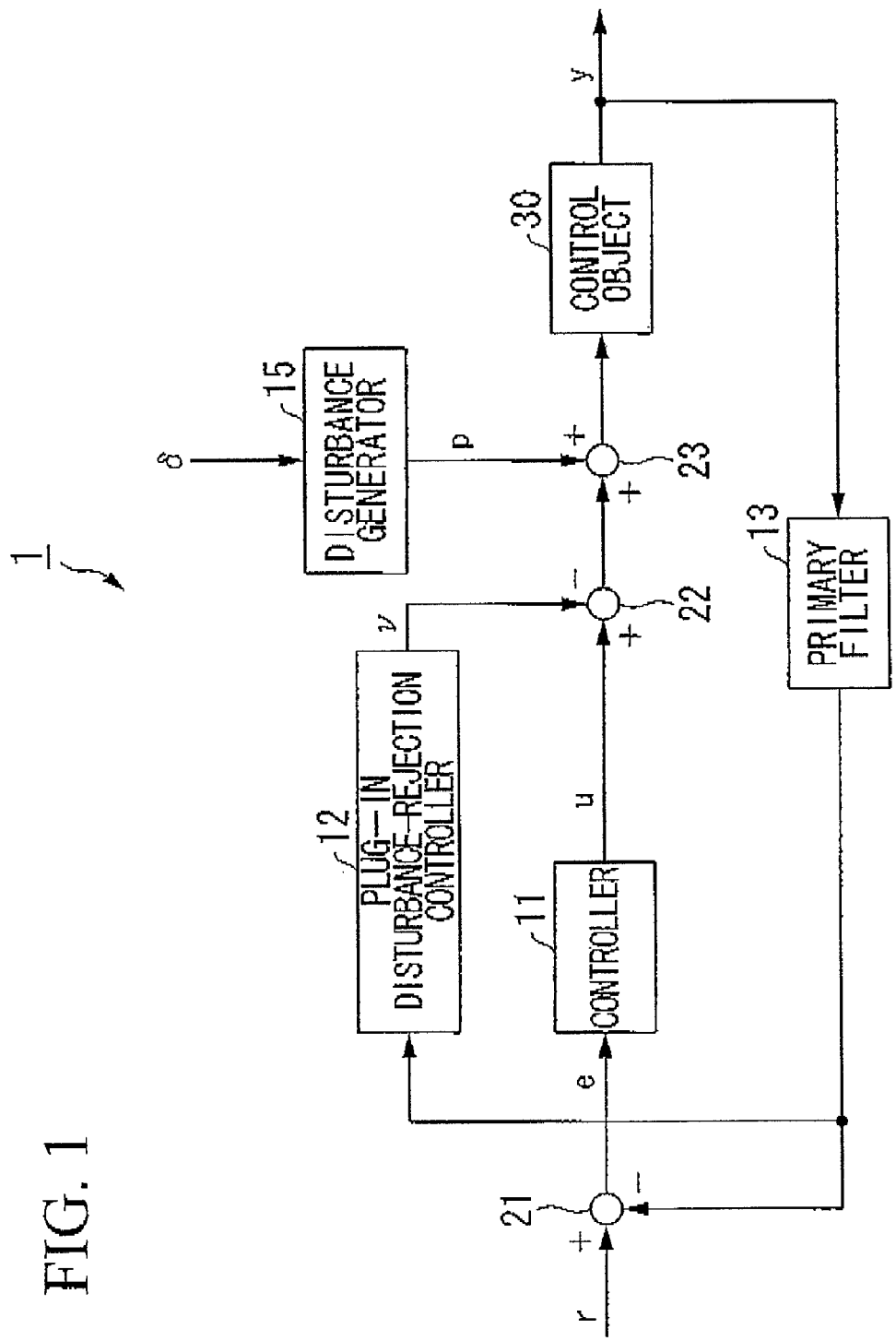
FIG. 1 is a schematic block diagram illustrating the configuration of a process control apparatus in accordance with a first embodiment of the present invention.

FIG. 1 is a schematic block diagram illustrating the configuration of a process control apparatus in accordance with a first embodiment of the present invention. A process control apparatus 1 may include, but is not limited to, a control unit 11 as a primary control unit, a plug-in disturbance-rejection controller 12 as a secondary control unit and a primary filter 13. The process control apparatus 1 is configured to control a control target 30.

The control unit 11 and the primary filter 13 may constitute part of the feedback loop which performs feedback control to the control target 30. A disturbance generator 15 is a virtual device which generates disturbance that is applied to the control target 30. The disturbance generator 15 is used to design the plug-in disturbance-rejection controller 12. The disturbance generator 15 is provided outside the process control apparatus 1.

As shown in FIG. 1, a setting value "r" to the control target 30 and a measured value "y" of the control target "y" are input into a first summing point 21. The first summing point 21 generates an error signal "e" that represent a difference between the setting value "r" and the measured value "y". The error signal "e" is input into the control unit 11. The control unit 11 is designed to perform a sampled proportional integral control (sampled PI control) to the control target 30 in the environment that the period of disturbance is not specified. The control unit 11 generates an manipulated value "u" based on the input error signal "e". The manipulated value "u" is to be used to allow the control unit 11 to perform the sampled proportional integral control as the feedback control to the control target 30.

In a typical case, the control unit 11 can be designed to perform the sampled proportional integral control to the control target 30. In other case, the control unit 11 may be designed to perform the sampled proportional plus derivate control (sampled PD control) to the control target 30. In still other case, the control unit 11 may be designed to perform the sampled proportional integral plus derivate control (sampled PID control) to the control target 30. In other cases, the control unit 11 may be designed to perform the other laminar discrete time control to the control target 30. Typical examples of the control by the control unit 11 may include, but are not limited to, the general laminar discrete time control, the sampled proportional integral control (sampled PI control), the sampled proportional plus derivate control (sampled PD control), and the sampled proportional integral plus derivate control (sampled PID control).

The plug-in disturbance-rejection controller 12 as a secondary control unit is added into the feedback loop that includes the control unit 11. The plug-in disturbance-rejection controller 12 is designed using the internal model principle so as to reject the disturbance applied to the feedback loop by use of the measured value "y" of the control target 30. The internal model principle is a principle that it is essential for perfect follow-up control and disturbance-rejecting control that the feedback loop has a scheme to generate signals which are intended to be followed up or are rejected.

In accordance with this embodiment, the plug-in disturbance-rejection controller 12 is designed, while virtually providing the disturbance generator 15 for generating the disturbance in the feedback loop. In other words, the plug-in disturbance-rejection controller 12 is designed using the internal model principle. The plug-in disturbance-rejection controller 12 may be regarded to include a virtual generator that generates the disturbance, wherein the virtual generator is the same as the disturbance generator 15. The plug-in disturbance-rejection controller 12 is configured to generate a manipulated value "v" which may reject the disturbance efficiently.

The disturbance to be applied to the control target 30 or the feedback loop may have a variety of periodic components. The periodic component is substantially equivalent to the frequency component. The plug-in disturbance-rejection controller 12 is designed to reject some of the main periodic components of the disturbance that is applied to the feedback loop and to suppress any excess increase of the other periodic components due to the waterbed effect. For example, the plug-in disturbance-rejection controller 12 may be configured to set attenuation coefficients separately for the main periodic components of the disturbance that is applied to the feedback loop, so as to suppress any excess increase of the other periodic components due to the waterbed effect. Detailed descriptions of any available design method of the plug-in disturbance-rejection controller 12 will be made later.

The control unit 11 outputs the manipulated value "u". The plug-in disturbance-rejection controller 12 outputs the manipulated value "v". The manipulated value "u" and the manipulated value "v" are input into a second summing point 22. The second summing point 22 subtracts between the manipulated value "u" and the manipulated value "v", thereby generating a subtracted manipulated value. The subtracted manipulated value is output from the second summing point 22. The subtracted manipulated value is then input into a third summing point 23. The disturbance generator 15 receives an input pulse "δ" and generates a periodic disturbance "p". The subtracted manipulated value and the periodic disturbance "p" are input into the third summing point 23. The subtracted manipulated value and the periodic disturbance "p" are summed in the third summing point 23. The sum of the subtracted manipulated value and the periodic disturbance "p" are input into the control target 30.

As described above, the plug-in disturbance-rejection controller 12 is designed in consideration of the waterbed effect. It is difficult to solve the dilemma of the waterbed effect with respect to the frequency characteristic of the feedback control system. The primary filter 13 is provided in order to compensate for a frequency band, for example, a high frequency band, in which a gain is increased due to the waterbed effects that are caused by the plug-in disturbance-rejection controller 12. The output from the primary filter 13 is fed back to the first summing point 21. The output from the primary filter 13 is also input into the plug-in disturbance-rejection controller 12. The disturbance generator 15 is configured to generate the periodic disturbance "p" from the input pulse "δ" which is an impulse-like pulse having an extremely short width.

The setting value "r" is set for the control target 30. The setting value "r" is input into the first summing point 21. The output from the primary filter 13 is also input into the first summing point 21. The subtraction between the setting value "r" and the output from the primary filter 13 is calculated by the first summing point 21, thereby generating the error signal "e". The error signal "e" is output from the first summing point 21 and then input into the control unit 11. The control unit 11 generates the manipulated value "u" based on the error signal "e". The output from the primary filter 13 is also input into the plug-in disturbance-rejection controller 12. The plug-in disturbance-rejection controller 12 outputs the manipulated value "v" which depends on the output from the primary filter 13.

The manipulated value "u" output from the control unit 11 and the manipulated value "v" output from the plug-in disturbance-rejection controller 12 are input into the second summing point 22. The subtraction between the manipulated value "u" and the manipulated value "v" is performed by the second summing point 22. The subtracted manipulated value is then input into the third summing point 23. The periodic disturbance "p" is also input into the third summing point 23. The subtracted manipulated value and the periodic disturbance "p" are summed in the third summing point 23. The sum of the subtracted manipulated value and the periodic disturbance "p" are input into the control target 30. The control to the control target 30 is made depending upon the subtracted manipulated value. Namely, the predetermined frequency components (periodic components) are subtracted from the measured value of the control target 30 thereby obtaining a subtracted measurement value. The subtracted measurement value "y" is output from the control target 30 and input into the primary filter 13. The subtracted measurement value "y" is filtered by the primary filter 13. The filtered measurement value is output from the primary filter 13 and then input into both the first summing point 21 and the plug-in disturbance-rejection controller 12. The feedback control is made to reject the disturbance applied to the feedback loop including the control target 30.

The design method for the plug-in disturbance-rejection controller 12 will subsequently be described. The control target 30 needs to be modeled to design the plug-in disturbance-rejection controller 12. In accordance with the actual process control, the data collection is made for every control period to perform control operation. A discrete time model $P(z^{-1})$ for the control target 30 can be represented by the following equation (1).

[Equation 1]

$$P(z^{-1}) = \frac{z^{-d}B(z^{-1})}{A(z^{-1})} \quad (1)$$

where $A(z^{-1})$ and $B(z^{-1})$ are given by the following equation (2), and the variable "d" is the dead-time that is represented by the discrete time.

[Equation 2]

$$\begin{cases} A(z^{-1}) = 1 + a_1 z^{-1} + \ldots + a_{n_A} z^{-n_A} \\ B(z^{-1}) = b_1 z^{-1} + \ldots + b_{n_B} z^{-n_B} \end{cases} \quad (2)$$

The control unit 11 is designed so that the measured value "y" follows the setting value "r" in the environment that the period of the disturbance is not specified. The control unit 11 can be represented by the $C(q^{-1})$ in the following equation (3).

[Equation 3]

$$C(z^{-1}) = \frac{R(z^{-1})}{S(z^{-1})}. \quad (3)$$

where $S(z^{-1})$ and $R(z^{-1})$ are given by the following equation (4).

[Equation 4]

$$\begin{cases} S(z^{-1}) = 1 + s_1 z^{-1} + \ldots + s_{n_S} z^{-n_S} \\ R(z^{-1}) = r_0 + r_1 z^{-1} + \ldots + r_{n_R} z^{-n_R} \end{cases} \quad (4)$$

As described above, the plug-in disturbance-rejection controller 12 is designed using the internal model principle. Thus, tide periodic disturbance "p" needs any model. The periodic disturbance "p" can be modeled using a disturbance generator $W(q^{-1})$ that outputs a sine wave signal upon input of an impulse function $\delta(t)$ which corresponds to the pulse $\delta$, wherein disturbance generator $W(q^{-1})$ is given by the following equation (5).

[Equation 5]

$$p(t) = W(q^{-1})\delta(t) = \frac{N_p(q^{-1})}{D_p(q^{-1})}\delta(t) \quad (5)$$

where $D_P(q^{-1})$ and $N_p(q^{-1})$ are given by the following equation (6).

[Equation 6]

$$\begin{cases} D_p(q^{-1}) = 1 + d_1 q^{-1} + \ldots + d_{D_p} q^{-n_{D_p}} \\ N_p(q^{-1}) = n_0 + n_1 q^{-1} + \ldots + n_{N_p} q^{-n_{N_p}} \end{cases} \quad (6)$$

The following hypotheses (H1), (H2), (H3) and (H4) are set for the above-descried modeled system.

(H1): $A(z^{-1})$, $B(z^{-1})$, and the dead-time "d" are known.

(H2): The disturbance generator 15 has a pole (a root of a denominator polynomial) on the unit circle of the complex plane.

(H3): The order $n_{D_p}$ of the denominator polynomial of the disturbance generator 15 is known.

(H4): $B(q^{-1})$ and $S(q^{-1})$ are free of factors of $D_p(q^{-1})$.

The above-described hypothesis (H1) shows that process parameters are decided by curve fitting methods such as system identification and step response. The above-described hypothesis (H2) provides the necessary and sufficient condition for the disturbance generator 15 to output the sine wave. The above-described hypothesis (H3) shows that the number of periodic component (frequency component) of the disturbance is known. Actually, however, it is difficult to obtain the accurate number of the frequency component. Thus, a measured value including the periodic disturbance has previously been analyzed so as to extract some dominant frequency components for the configuration of the disturbance generator 15. The frequency components used for the configuration of the disturbance generator 15 are the main periodic components (the main frequency components) described above. The above-described hypothesis (H4) shows that any previously designed control unit 11 or process is unable to reject the influence of the disturbance "p".

The plug-in disturbance-rejection controller 12 is designed using the modeled system described above. It is hereby assumed that the configuration of the plug-in disturbance-rejection controller 12 is given by the following equation (7).

[Equation 7]

$$\sum(z^{-1}) = \frac{K(z^{-1})}{J(z^{-1})} \quad (7)$$

where $J(z^{-1})$ and $K(z^{-1})$ are given by the following equation (8).

[Equation 8]

$$\begin{cases} J(z^{-1}) = 1 + j_1 z^{-1} + \ldots + j_{n_J} z^{-n_J} \\ K(z^{-1}) = k_0 + k_1 z^{-1} + \ldots + k_{n_K} z^{-n_K} \end{cases} \quad (8)$$

With reference to FIG. 1, the manipulated value "v" is subtracted from manipulated value "u" to generate a subtracted manipulated value, wherein the manipulated value "v" is output from the plug-in disturbance-rejection controller 12, and the manipulated value "u" is output from the control unit 11. The periodic disturbance "p" that is output from the disturbance generator 15 is added to the subtracted manipulated value, thereby generating the sum of the subtracted manipulated value and the periodic disturbance "p". The sum of the subtracted manipulated value and the periodic disturbance "p" are input into the control target 30. The control target 30 outputs the measured value "y". Influence of the disturbance at the measured value "y", which can be represented by the time function y(t), can be expressed by using the above-described equation (5). The influence of the disturbance at the measured value "y" is given by the following equation 9.

[Equation 9]

$$y(t) = \frac{q^{-d} \cdot (1 - \beta q^{-1}) \cdot B(q^{-1})S(q^{-1})J(q^{-1})}{\Omega(q^{-1})} \frac{N_p(q^{-1})}{D_p(q^{-1})}\delta(t) \quad (9)$$

where $Q(z^{-1})$ is the characteristic polynomial of the closed loop and is given by the following equation (10).

[Equation 10]

$$\Omega(z^{-1}) = S(z^{-1})\overline{A}(z^{-1})J(z^{-1}) + \quad (10)$$
$$z^{-d}R(z^{-1})\overline{B}(z^{-1})J(z^{-1}) + z^{-d}K(z^{-1})\overline{B}(z^{-1})S(z^{-1})$$
$$\overline{A}(z^{-1}) := (1 - \beta z^{-1}) \cdot A(z^{-1})$$
$$\overline{B}(z^{-1}) := (1 - \beta) \cdot B(z^{-1})$$

where $\beta$ is the coefficient of the primary filter 13.

In accordance with the internal model principle, in order to reject the influence of the disturbance from the measured value "y", it is necessary that the denominator polynomial of the plug-in disturbance-rejection controller 12 has the denominator polynomial $D_p(q^{-1})$ of the disturbance generator 15, and those are off-set in the equation (9). In this point of view, the denominator polynomial of the plug-in disturbance-rejection controller 12 is given by the following equation (11).

[Equation 11]

$$J(z^{-1}) = D_p(z^{-1})J^1(z^{-1}) \quad (11)$$

In accordance with the above-described hypotheses, the denominator polynomial $D_p(q^{-1})$ has the root of a denominator polynomial) on the unit circle of the complex plane, wherein the unit circle is expressed by $\exp(i\omega_1 T_s):1=1, 2, \ldots, n$). The denominator polynomial $D_p(q^{-1})$ is given by the following equation (12).

[Equation 12]

$$D_p(z^{-1}) = (1 - 2\cos(\omega_1 T_s)z^{-1} + z^{-2}) \times \quad (12)$$
$$(1 - 2\cos(\omega_2 T_s)z^{-1} + z^{-2}) \times \ldots \times (1 - 2\cos(\omega_n T_s)z^{-1} + z^{-2})$$

$T_s$ is the sampling period.

In accordance with the above-described equation (11), the denominator polynomial of the plug-in disturbance-rejection controller 12 has the same root as that of the above-described equation (12). The gain becomes infinite when the frequency is $\omega_1$. The increase of the gain in a frequency band causes the waterbed effects that decrease the gain in other frequency band. This phenomenon is unsuitable for the process control apparatus that has wide frequency distribution of the periodic disturbance.

Some dominant frequency components (main frequency components) of the periodic disturbance are somewhat attenuated to reduce the magnitude of counter-reaction in other frequency band. For this purpose, the attenuation coefficient $\zeta_1$ is introduced into $D_p(q^{-1})$, and the configuration of the disturbance generator 15 is given by the following equation (13).

[Equation 13]

$$D_p(z^{-1}) = (1 - 2e^{-\alpha_1 T_c}\cos(\omega_1 T_s)z^{-1} + e^{-2\alpha_1 T_s}z^{-2}) \times \quad (13)$$
$$(1 - 2e^{-\alpha_2 T_s}\cos(\omega_2 T_s)z^{-1} + e^{-2\alpha_2 T_s}z^{-2}) \times \ldots \times$$
$$(1 - 2e^{-\alpha_n T_s}\cos(\omega_n T_s)z^{-1} + e^{-2\alpha_n T_s}z^{-2}) \quad \alpha_1 := \zeta_1 \omega_1$$

The denominator polynomial of the plug-in disturbance-rejection controller 12 is decided based on the above-described equation (11).

The plug-in disturbance-rejection controller 12 is expressed by parameters as in the follow equation (14).

[Equation 14]

$$\begin{cases} J(z^{-1}) = J_x(z^{-1}) + J_y(z^{-1})Q(z^{-1}) \\ K(z^{-1}) = K_z(z^{-1}) + K_y(z^{-1})Q(z^{-1}) \end{cases} \quad (14)$$

The above-described equation (14) is substituted into the above-described equation (10), thereby obtaining the following equation (15).

[Equation 15]

$$\Omega = S\overline{A}J_x + S\overline{A}QJ_y + z^{-d}R\overline{B}J_x + z^{-d}R\overline{B}QJ_y +$$
$$z^{-d}K_x\overline{B}S + z^{-d}K_y Q\overline{B}S \quad (15)$$

where $J_y$ and $K_y$ are given by the following equation (16).

[Equation 16]

$$J_y(z^{-1}) = z^{-d}\overline{B}(z^{-1})S(z^{-1}) \quad K_y(z^{-1}) = \quad (16)$$
$$-(S(z^{-1})\overline{A}(z^{-1}) + z^{-d}R(z^{-1})\overline{B}(z^{-1}))$$

The above-described equation (15) is can be expressed by the following equation (17).

[Equation 17]

$$\Omega = S\overline{A}J_x + z^{-d}R\overline{B}J_x + z^{-d}K_x\overline{B}S \quad (17)$$

Thus, $J_X$ and $K_X$ are decided so that the above-described equation (17) is the stable polynomial. When $J_x(z^{-1})=1$ and $K_x(z^{-1})=0$, the above-described equation (17) is identical with the characteristic polynomial of the closed loop of the process control apparatus in the absence of disturbance before the plug-in disturbance-rejection controller 12 is introduced. Rejection of the disturbance is selectively made upon the need without reconfiguration of the feedback loop. It is unnecessary to stop the process control apparatus and the control target for reconfiguration of the feedback loop.

$Q(z^{-1})$ in the equation (14) is obtained as a solution of the following equation (18) from the above-described equations (11) and (14).

[Equation 18]

$$D_p(z^{-1})J'(z^{-1}) = \quad (18)$$
$$J_x(z^{-1}) + J_y(z^{-1})Q(z^{-1}) = 1 + z^{-d}\overline{B}(z^{-1})S(z^{-1})Q(z^{-1})$$
$$\therefore D_p(z^{-1})J'(z^{-1}) - z^{-d}\overline{B}(z^{-1})S(z^{-1})Q(z^{-1}) = 1$$

The above-described equation (18) is so called to as Bézout equation. The solvable condition is that $D_p$, and $z^{-d}\overline{B}S$ are irreducible. "$\overline{B}$" means B has the over bar, wherein the sign "‾" is positioned over B. This condition is established from the above-described hypothesis (H4). Solutions J' and Q are found. The plug-in disturbance-rejection controller 12 can be configured using $J_x$, $J_y$, $K_x$, $K_y$, and Q described above.

Second Embodiment

A process control apparatus in accordance with the second embodiment of the present invention will be described. When the period or the frequency of the periodic disturbance is constant, the above-described process control apparatus 1 including the above-described plug-in disturbance-rejection controller 12 may be effective to reject the disturbance having constant frequency. Actually, however, it is possible that the frequency of the periodic disturbance may always vary. This embodiment provides the process control apparatus that is effective to reject the periodic disturbance having varying frequency.

Figure 2:
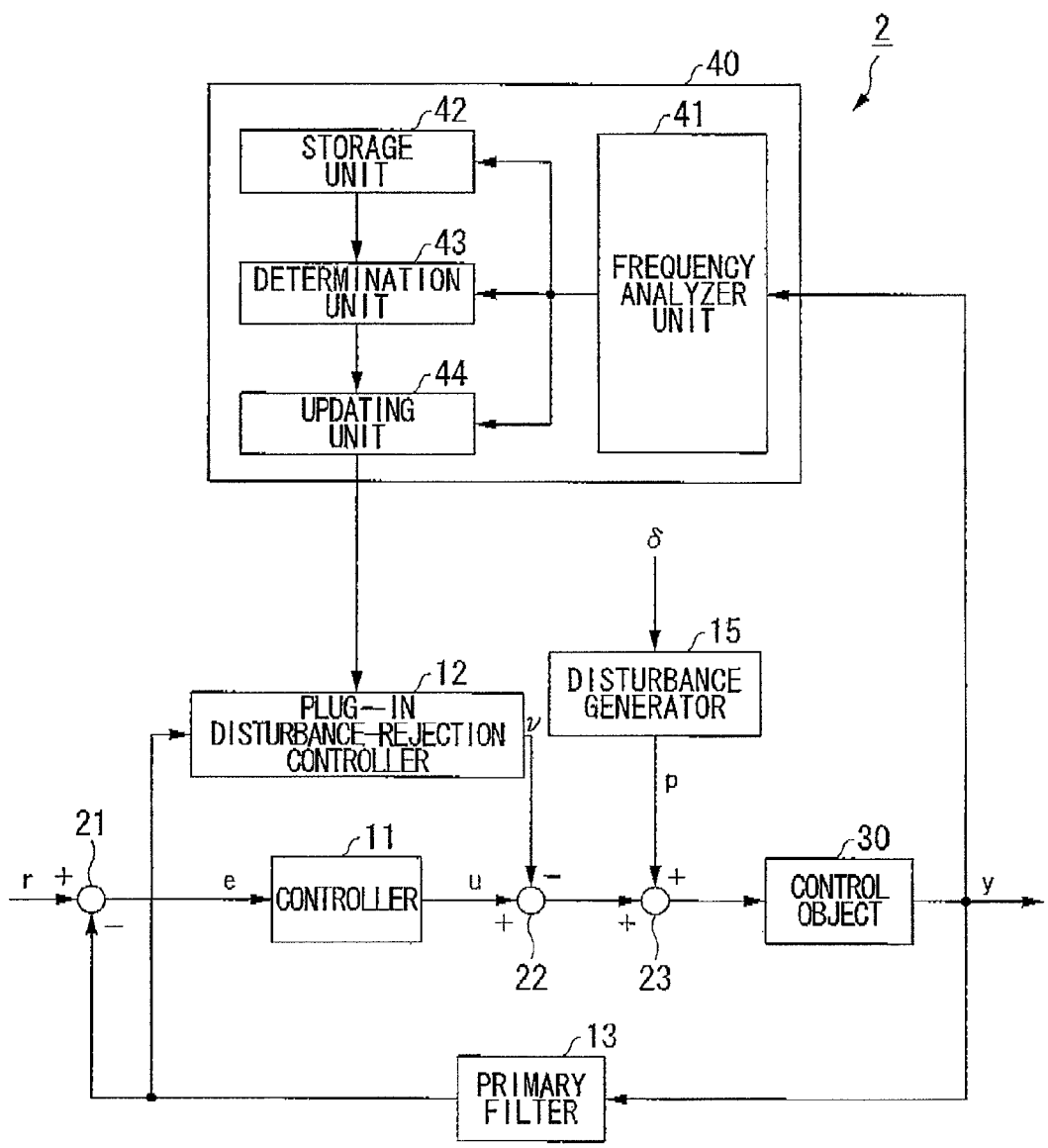
FIG. 2 is a block diagram illustrating the configuration of a process control apparatus in accordance with a second embodiment of the present invention.

FIG. 2 is a block diagram illustrating the configuration of a process control apparatus in accordance with the second embodiment of the present invention. A process control apparatus 2 may include, but is not limited to, a control unit 11 as a primary control unit, a plug-in disturbance-rejection controller 12 as a secondary control unit, a primary filter 13, and a control parameter updating unit 40. The process control apparatus 1 is configured to control a control target 30.

The control parameter updating unit 40 may include, but is not limited to, a frequency analyzer unit 41, a storage unit 42, a determination unit 43, and an updating unit 44. The control parameter updating unit 40 is configured to update control parameters of the plug-in disturbance-rejection controller 12 in response to the variation of the main periodic components (the main frequency components) of the measured value "y" of the control target 30.

The frequency analyzer unit 41 is configured to perform frequency analysis of the measured value of the control target 30. The storage unit 42 sequentially stores analysis results by the frequency analyzer unit 41.

The determination unit 43 compares a new analysis result from the frequency analyzer unit 41 to the previous analysis result that has been stored in the storage unit 42 so that the determination unit 43 determines the presence or absence of variation of the main frequency components. In some cases, the determination unit 43 compares main frequency components included in the new analysis result to main frequency components included in the previous analysis result so that the determination unit 43 determines whether or not each of the frequency differences is equal to or more than a predetermined threshold $\Delta\omega$. The determination unit 43 determines the presence of variation of the main frequency component when the frequency difference is equal to or more than the predetermined threshold $\Delta\omega$. The determination unit 43 determines the absence of variation of the main frequency component when the frequency difference is less than the predetermined threshold $\Delta\omega$. The determination unit 43 determines the presence of variation of the main frequency components when at least one of frequency differences of the plural main frequency components is equal to or more than the predetermined threshold $\Delta\omega$.

The updating unit 44 updates the control parameter of the plug-in disturbance-rejection controller 12 in accordance with the new analysis result of the frequency analyzer unit 41 when the determination unit 43 determines the presence of variation of the main frequency component or components. The updating unit 44 does not update the control parameter of the plug-in disturbance-rejection contoller 12 when the determination unit 43 determines the absence of variation of the main frequency component or components. A monitoring time is set in the control parameter updating unit 40. After the monitoring time has lapsed, then the control parameter updating unit 40 captures the measured value "y" of the control target 30 to perform the frequency analysis.

Figure 3:
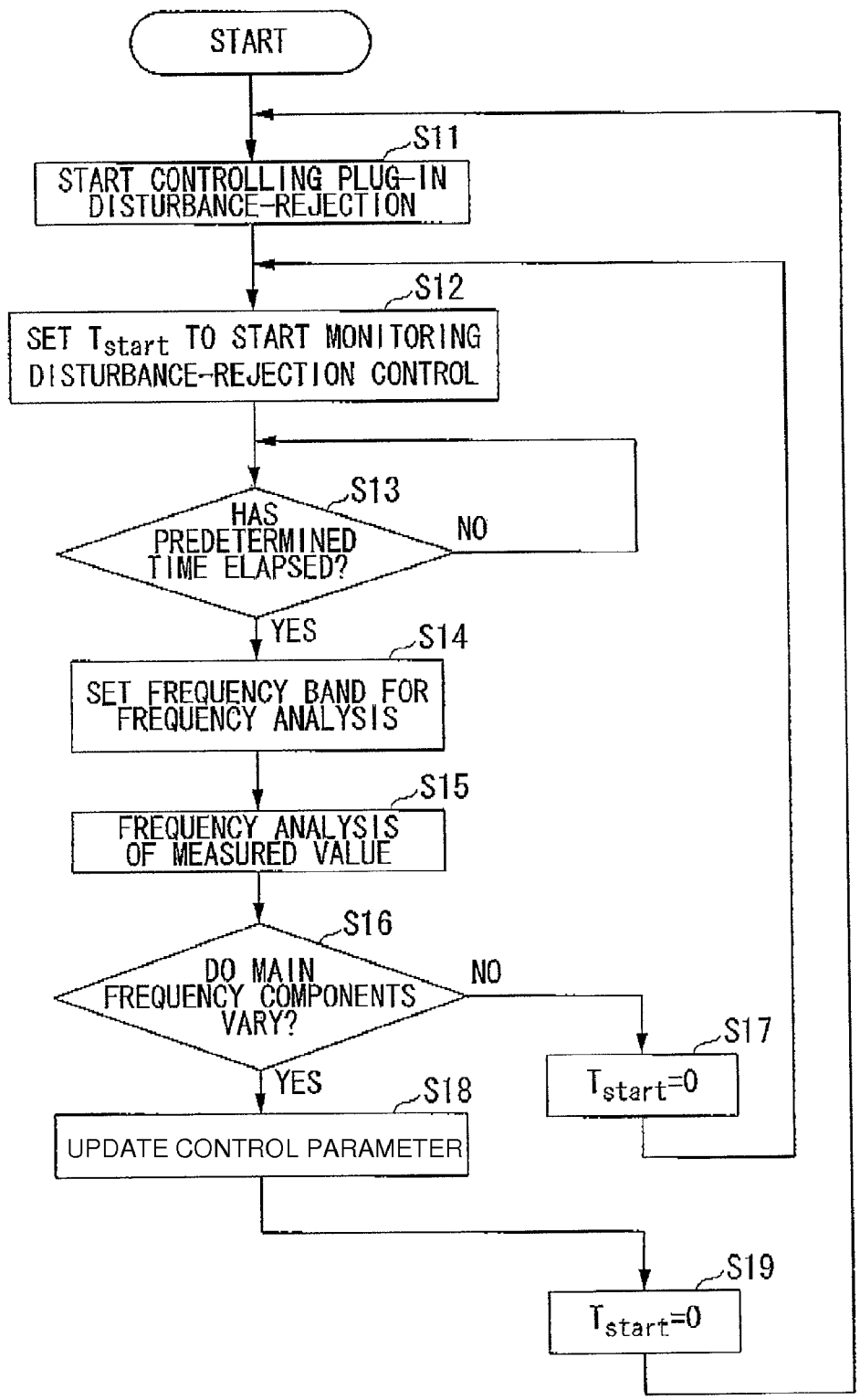
FIG. 3 is a flow chart illustrating the sequential operations of the process control apparatus shown in FIG. 2.

FIG. 3 is a flow chart illustrating the sequential operations of the process control apparatus shown in FIG. 2. Upon power on of the process control apparatus 2, a set of sequential processes shown in FIG. 3 will start.

In Step S11, the control unit 11 of the process control unit 2 outputs the manipulated value "u", and the plug-in disturbance-rejection controller 12 outputs the manipulated value "v", thereby starting the control of the control target 30.

In Step S12, the control parameter updating unit 40 sets a disturbance-rejecting control monitoring start time Tstart that is a time to start monitoring disturbance-rejecting control, so that the control parameter updating unit 40 can perform the frequency analysis when a monitoring time period has lapsed after the disturbance-rejecting control monitoring start time Tstart.

In Step S13, the control parameter updating unit 40 determines whether or not the monitoring time period has lapsed after the control parameter updating unit 40 started to monitor the disturbance-rejecting control. In some cases, the control parameter updating unit 40 may subtract the disturbance-rejecting control monitoring start time Tstart from the present time "t" to find the subtracted time (t−Tstart), so that the control parameter updating unit 40 determines whether or not the subtracted time (t−Tstart) is equal to or more than a predetermined monitoring time period N. If the control parameter updating unit 40 determines that the monitoring time period has not yet lapsed after the control parameter updating unit 40 started to monitor the disturbance-rejecting control, then the control parameter updating unit 40 will repeat the process of Step S13.

In Step S14, if the control parameter updating unit 40 determines that the monitoring time period has already lapsed after the control parameter updating unit 40 started to monitor the disturbance-rejecting control, then the control parameter updating unit 40 sets a frequency range for frequency analysis into the frequency analyzer unit 41. In some cases, the control parameter updating unit 40 sets a minimum frequency $\omega_{MIN}$ and a maximum frequency $\omega_{MAX}$ into the frequency analyzer unit 41, thereby defining the frequency range for frequency analysis.

In Step S15, once the frequency range for frequency analysis has been set in the frequency analyzer unit 41, the frequency analyzer unit 41 captures the measured value "y" of the control target 30 and performs the frequency analysis of the measured value "y".

Figure 4:
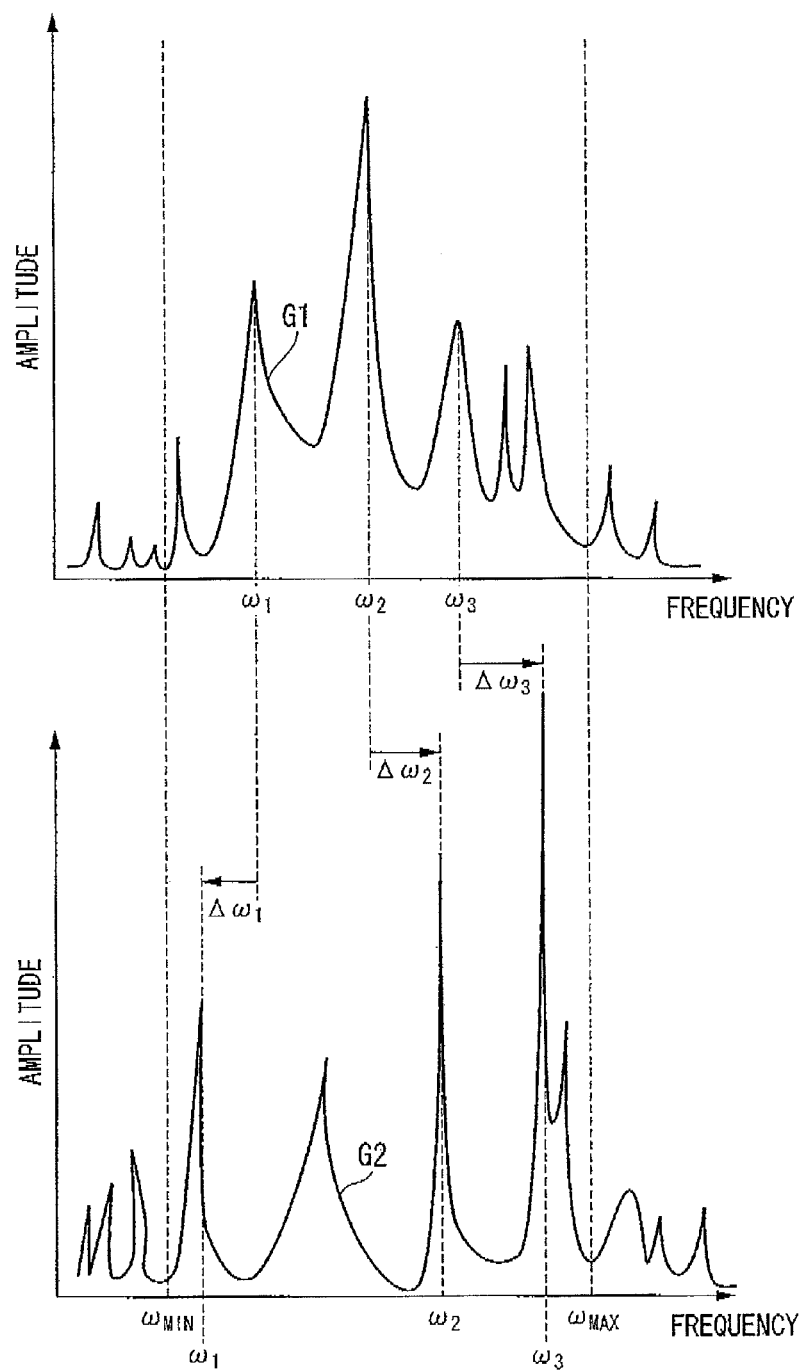
FIG. 4 is a diagram illustrating first and second results of the frequency analysis performed by the process control apparatus shown in FIG. 2.

FIG. 4 is a diagram illustrating first and second results of the frequency analysis performed by the process control apparatus shown in FIG. 2. G1 represents the first result of the frequency analysis at a fist time, and G2 represents the second result of the frequency analysis at a second time next to the first time. As shown in FIG. 4, a plurality of peak values is obtained by the frequency analysis of the measured value "y" of the control target 30. The frequency analyzer unit 41 obtains the result of the frequency analysis of the measured value "y" and finds a plurality of peak values from the result of the frequency analysis. The frequency analyzer unit 41 may determine one or more frequency (one or more main frequency components) of one or more peak values that have largest amplitudes. In some cases, the number of the peak value or values is predetermined. The frequency analyzer unit 41 may determine the predetermined number of frequency (the predetermined number of main frequency components) of the predetermined number of peak values having largest amplitudes. In one example shown in FIG. 4, the frequency range is defined between the minimum frequency $\omega_{MIN}$ and the maximum frequency $\omega_{MAX}$. The frequency analyzer unit 41 determines, in the frequency range, three frequencies $\omega_1$, $\omega_2$ and $\omega_3$ of the three largest peaks from the result G1 of the frequency analysis. The relationship $\omega_1 \leq \omega_2 \leq \omega_3$ is established. The three frequencies $\omega_1$, $\omega_2$ and $\omega_3$ are stored in the storage unit 42.

In Step S16, the determination unit 43 determines whether or not there is present any variations of the main frequency components obtained by the frequency analysis in Step S15. When the determination unit 43 determines no variations of the main frequency components, in Step 17 the control parameter updating unit 40 initializes "0" for the disturbance-rejecting control monitoring start time Tstart as a time to start monitoring. In Step S12, the control parameter updating unit 40 re-sets a new disturbance-rejecting control monitoring start time Tstart that is a new time to start monitoring disturbance-rejecting control.

The control parameter updating unit 40 determines, in Step S13, whether or not the monitoring time period has lapsed, after the control parameter updating unit 40 started to monitor the disturbance-rejecting control. The control parameter updating unit 40 repeats this process until the control parameter updating unit 40 determines that the monitoring time period has lapsed, after the control parameter updating unit 40 started to monitor the disturbance-rejecting control. After the control parameter updating unit 40 determines that the monitoring time period has lapsed, then the control parameter updating unit 40 sets a new frequency range for frequency analysis into the frequency analyzer unit 41 in Step S14.

Once the frequency range for frequency analysis has been set in the frequency analyzer unit 41, the frequency analyzer with 41 captures the measured value "y" of the control target 30 and performs the further frequency analysis of the measured value "y" in Step S15. The frequency analyzer unit 41 obtains the second result of the frequency analysis as represented by G2 in FIG. 4. In the same frequency range between the minimum frequency $\omega_{MIN}$ and the maximum frequency $\omega_{MAX}$, the frequency analyzer unit 41 determines new three frequencies $\omega_1$, $\omega_2$ and $\omega_3$ of the three largest peaks from the result G2 of the frequency analysis. The relationship $\omega_1 \leq \omega_2 \leq \omega_3$ is established. The three frequencies $\omega_1$, $\omega_2$ and $\omega_3$ are stored in the storage unit 42.

In Step S16, the determination unit 43 determines whether or not there is present any variations of the main frequency components obtained by the frequency analysis in Step S15.

The determination unit 43 reads the old frequencies $\omega_1$, $\omega_2$ and $\omega_3$ of the three largest peaks from the result G1 of the frequency analysis out of the storage unit 42. The determination unit 43 determines the difference between the new three frequencies $\omega_1$, $\omega_2$ and $\omega_3$ of the three largest peaks from the result G2 of the frequency analysis and the old frequencies $\omega_1$, $\omega_2$ and $\omega_3$ of the three largest peaks from the result G1 of the frequency analysis. In the example shown in FIG. 4, the frequency_$\omega_1$ has the variation $\Delta\omega_1$. The frequency_$\omega_2$ has the variation $\Delta\omega_2$. The frequency_$\omega_3$ has the variation $\Delta\omega_3$. Namely, the frequency_$\omega_1$ of the result G2 of the frequency analysis is lower by variation $\Delta\omega_1$ than the frequency_$\omega_1$ of the result G1 of the frequency analysis. The frequency_$\omega_2$ of the result G2 of the frequency analysis is higher by variation $\Delta\omega_2$ than the frequency_$\omega_2$ of the result G1 of the frequency analysis. The frequency_$\omega_3$ of the result G2 of the frequency analysis is higher by variation $\Delta\omega_3$ than the frequency_$\omega_3$ of the result G1 of the frequency analysis.

The determination unit 43 determines whether or not the first to third frequency variations $\Delta\omega_1$, $\Delta\omega_2$, and $\Delta\omega_3$ are equal to or smaller than predetermined first to third thresholds. In some cases, the first to third thresholds may be the same as each other. Namely, a single threshold can be set for the first to third frequency variations $\Delta\omega_1$, $\Delta\omega_2$, and $\Delta\omega_3$. In other cases, the first to third thresholds may be different from each other. Namely, different thresholds can be set for the first to third frequency variations $\Delta\omega_1$, $\Delta\omega_2$, and $\Delta\omega_3$.

When the determination unit 43 determines that the first to third frequency variations $\Delta\omega_1$, $\Delta\omega_2$, and $\Delta\omega_3$ are equal to or smaller than predetermined first to third thresholds, then the determination unit 43 determines the presence of the variations of the main frequency components. The determination unit 43 sends the updating unit 44 the determination result that the presence of the variations of the main frequency components is determined.

In Step S18, the updating unit 44 updates the control parameters of the plug-in disturbance-rejection controller 12, based on the result of the determination by the determination unit 43, in accordance with the new three frequencies $\omega_1$, $\omega_2$ and $\omega_3$ of the three largest peaks from the result G12 of the frequency analysis that are obtained by the frequency analyzer unit 41. Once the updating unit 44 has updated the control parameters of the plug-in disturbance-rejection controller 12, in Step S19 the control parameter updating unit 40 initializes "0" for the disturbance-rejecting control monitoring start time Tstart as a time to start monitoring. In Step S11, the plug-in disturbance-rejecting control of the control target 30 is restarted.

The above-described processes will be repeated so that the control parameters of the plug-in disturbance-rejection controller 12 are dynamically updated in accordance with the result of the frequency analysis of the measured value "y" of the control target 30. The plug-in disturbance-rejection controller 12 generates the manipulated value "v" which may reject the disturbance efficiently, in accordance with the frequencies of the main frequency components.

Paper Machine:

The above-described process control apparatuses of the first and second embodiments can be applied to any machine such as a manufacture apparatus. Typical examples of the machine, to which the above-described process control apparatuses are applicable, may include, but are not limited to, a manufacture apparatus for producing a sheet product such as a paper machine.

Figure 5:
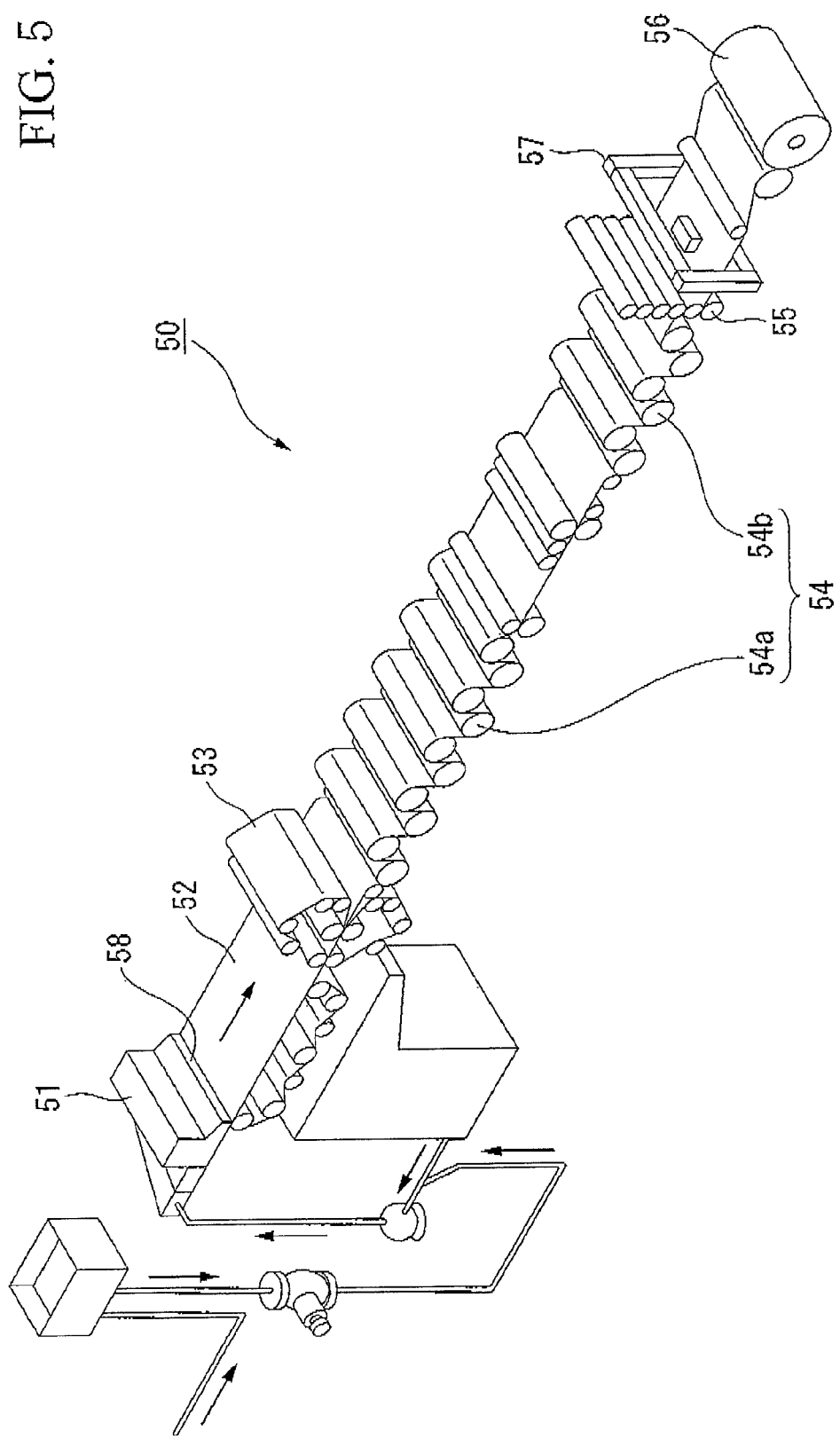
FIG. 5 is a schematic perspective view illustrating a paper machine that is controlled by the process control apparatus.
Figure 6:
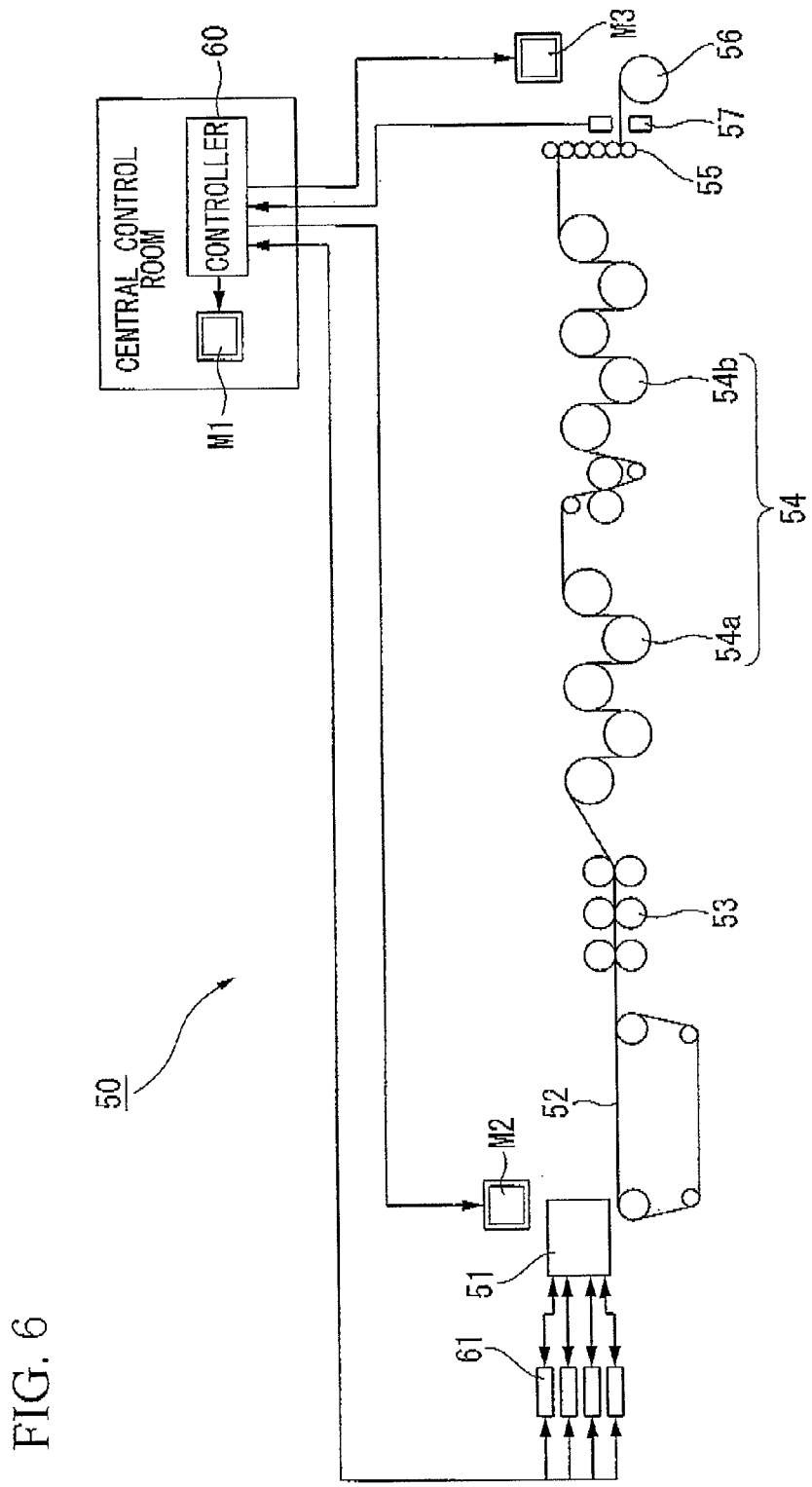
FIG. 6 is a diagram illustrating the configuration of the paper machine of FIG. 5 that is controlled by the process control apparatus.

FIG. 5 is a schematic perspective view illustrating a paper machine that is controlled by the process control apparatus FIG. 6 is a diagram illustrating the configuration of the paper machine of FIG. 5 that is controlled by the process control apparatus. The process control apparatus is configured to control the paper machine so that the paper machine produces a produced paper as a sheet product that has a predetermined profile in width.

As shown in FIG. 5, a paper machine 50 may include, but is not limited to, a head box 51, a wire part 52, a press part 53, a dry part 54, a calendar part 55, and a reel part 56. The paper machine 50 can be regarded as the control target 30 that is subjected to the process control by either the process control apparatus 1 or 2.

The head box 51 is a part to which a paper material is supplied. The wire part 52 is positioned downstream of the head box 51. The wire part 52 is a part that dehydrates the paper material that has been supplied on the wire surface. A jet of the paper material gets on the wire at its first surface. The first surface will be called to as a wire-surface. The second surface opposing the first surface will be called to as a felt-surface. The press part 53 is positioned downstream of the wire part 52. The press part 53 presses the paper material by a press roll with a felt to squeeze water from the paper material.

The dry part 54 is a part to dry the paper. The dry part 54 is positioned downstream of the press part 53. The dry part 54 includes a pre-dryer 54a and a after-dryer 54b. The calendar part 55 is positioned downstream of the dry part 54. The calendar part 55 squeezes and crushes the dried paper. The reel part 56 is positioned downstream of the calendar part 55. The reel part 56 reels the paper.

As shown in FIGS. 5 and 6, the paper machine 50 further includes a basis-weight measurement device 57 that is positioned upstream of the reel part 56 and downstream of the calendar part 55. The basis-weight measurement device 57 measures the basis-weight of the paper, namely measures the weight [g/m$^2$] of the paper per 1 m$^2$.

The basis-weight measurement device 57 is supported by a scanning part which can be configured to move reciprocally in the corss directions of the paper machine 50. The basis-weight measurement device 57 obtains basis-weight data while the scanning part scans the basis-weight measurement device 57. The basis-weight measurement device 57 is configured to measure the basis-weight profile as the control target 30.

As shown in FIG. 6, the paper machine 50 farther includes a control unit 60 that controls a plurality of operation terminals. In some cases, the control unit 60 may be placed in a central control room which might be positioned in a factory. The control unit 60 may have the above-described process control apparatus 1 or 2. The basis-weight measurement device 57 obtains the basis-weight data as the measurement result. The basis-weight measurement device 57 supplies the basis-weight data as the measured value "y" to the control unit 60. The control unit 60 prepares an actual basis-weight profile from the basis-weight data. The control unit 60 compares the actual basis-weight profile to an ideal basis-weight profile that has been registered. The control unit 60 controls the plurality of operation terminals so that the actual basis-weight profile approaches to the ideal basis-weight profile.

A typical example of the plurality of operation terminals may be slice-bolt operation terminals 61 as shown in FIG. 6. The slice-bolt operation terminals 61 adjust the opening degree of a slice lip 58 shown in FIG. 5. A first display M1 is placed in the central control room. A second display M2 is placed in the vicinity of the head box 51. A third display M3 is placed in the vicinity of the basis-weight measurement device 57. The first to third displays M1, M2, and M3 are connected to the control unit 60. The first to third displays M1, M2, and M3 display the actual basis-weight profile and the ideal basis-weight profile.

The paper material is fed to the head box 51 of the paper machine 50. The paper material is discharged from the slice lip 58. The discharged paper material is fed to the wire part 52 where the paper material is dehydrated. The dehydrated paper material is then fed to the press part 53. The dehydrated paper material is squeezed by the press part 53. The squeezed paper material is then fed to the dry part 54 which includes the pre-dryer 54a and the after-dryer 54b. The squeezed paper material is dried by the dry part 54. The dried paper material is fed to the calendar part 55. The dried paper is then squeezed and crashed by the calendar part 55. The paper is then reeled by the reel part 56.

The basis-weight measurement device 57 is positioned upstream of the reel part 56 and downstream of the calendar part 55. The basis-weight measurement device 57 measures the basis-weight of the paper. The basis-weight measurement device 57 obtains basis-weight data while the scanning part scans the basis-weight measurement device 57. The basis-weight measurement device 57 measures the basis-weight profile as the control target 30. The basis-weight measurement device 57 supplies the basis-weight data as the measured value "y" to the control unit 60. The control unit 60 prepares the actual basis-weight profile from the basis-weight data. The control unit 60 compares the actual basis-weight profile to the ideal basis-weight profile that has been registered, thereby preparing a basis-weight deviation profile. The control unit 60 controls the plurality of operation terminals so that the actual basis-weight profile approaches to the ideal basis-weight profile. The first to third displays M1, M2, and M3 display the actual basis-weight profile and the ideal basis-weight profile, and/or the basis-weight deviation profile.

The control unit 60 finds the manipulated value for the slice-bolt operation terminals 61 based on the basis-weight deviation profile. The control unit 60 supplies the manipulated value to the slice-bolt operation terminals 61, so that the slice-bolt operation terminals 61 adjust the opening degree of the slice lip 58. The above-described processes are repeated to adjust the operational parts, so that the basis-weight deviation profile is converged toward zero. The above-described control is performed by the control unit 11 in the process control apparatus 1 or 2.

The periodic disturbance to the paper machine 50 may be caused by the ripple of the paper material that runs through the pipe. The variation in frequency of the periodic disturbance may be caused by the difference of the paper material or the aging of the pipe. The periodic disturbance can be rejected by the control by the plug-in disturbance-rejection controller 12 that is provided in the process control apparatus 1 shown in FIG. 1.

The process control apparatus 2 shown in FIG. 2 can be used to reject the periodic disturbance efficiently. Even if the frequency of the periodic disturbance varies due to the aging, the plug-in disturbance-rejection controller 12 can output the manipulated value "v" that can efficiently reject the main frequency components in accordance with the variation, thereby rejecting the disturbance efficiently.

A simulation to the paper machine 50 having the process control apparatus 1 or 2 in accordance with the first or second embodiment will be described. The basis-weight profile for the paper machine 50 is modeled as the control target 30 shown in FIG. 1. It is assumed that the periodic disturbance of the modeled control target 30 has three main frequency components having frequencies $\omega_1$, $\omega_2$ and $\omega_3$, wherein $\omega_1$=0.0037 [rad/sec] (about 29 min. period), $\omega_2$=0.0051 [rad/sec] (about 20 min. period), $\omega_3$=0.0068 [rad/sec] (about 15 min. period). The disturbance generator 15 is modeled so as to generate the above-described periodic disturbance.

The plug-in disturbance-rejection controller 12 is designed to set first to third attenuation coefficients $\zeta_1$, $\zeta_2$, and $\zeta_3$, separately for the main three periodic components having frequencies $\omega_1$, $\omega_2$ and $\omega_3$ of the disturbance, wherein the first attenuation coefficient_$\zeta_1$ is 0.5, the second attenuation coefficient_$\zeta_2$ is 0.3, and the third attenuation coefficient_$\zeta_3$ is 0.2.

Figure 7A:
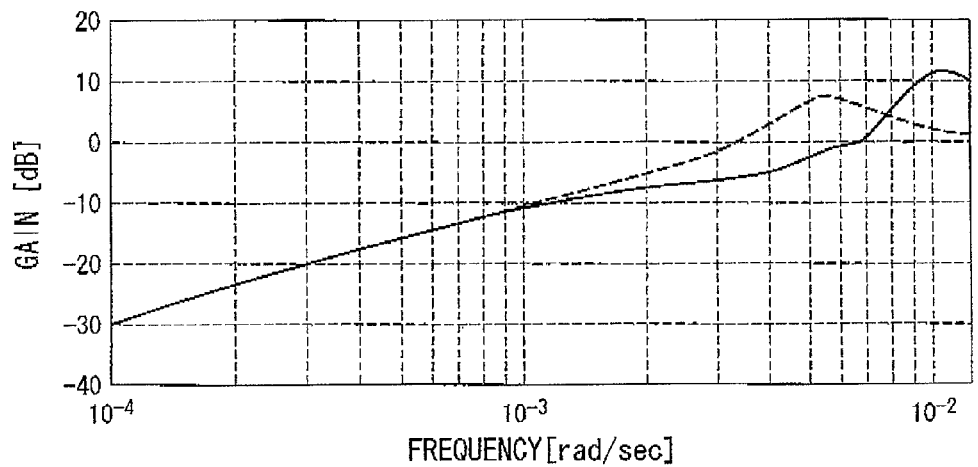
FIG. 7A is a diagram illustrating variations of the gains over frequency for a control system including a plug-in disturbance-rejection controller and another other control system free of the plug-in disturbance-rejection controller.
Figure 7B:
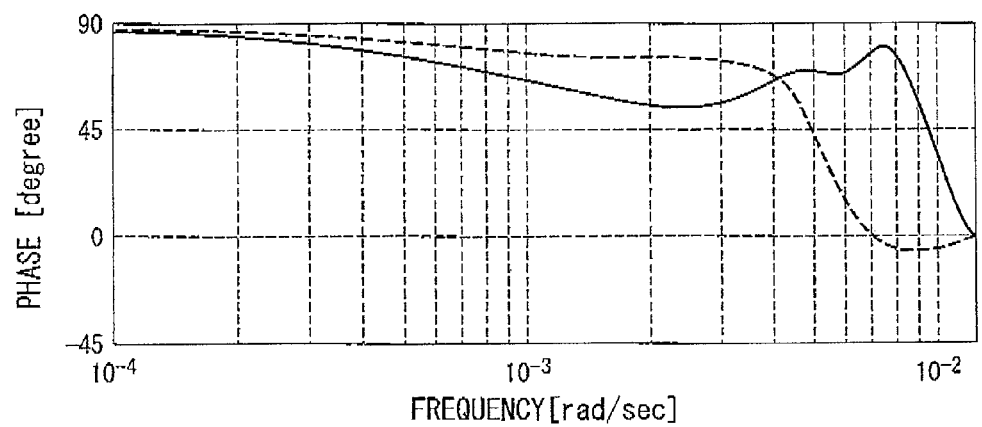
FIG. 7B is a diagram illustrating variations of the phase over frequency for a control system including a plug-in disturbance-rejection controller and another other control system free of the plug-in disturbance-rejection controller.

FIG. 7A is a diagram illustrating variations of the gains over frequency for the control system including the plug-in disturbance-rejection controller 12 and the other control system free of the plug-in disturbance-rejection controller 12. FIG. 7B is a diagram illustrating variations of the phase over frequency for the control system including the plug-in disturbance-rejection controller 12 and the other control system free of the plug-in disturbance-rejection controller 12.

FIGS. 7A and 7B show sensitivity curves of the control system including the plug-in disturbance-rejection controller 12 and the other control system free of the plug-in disturbance-rejection controller 12. The real line represents the sensitivity curve of the control system including the plug-in disturbance-rejection controller 12. The broken line represents the sensitivity curve of the control system free of the plug-in disturbance-rejection controller 12.

The periodic disturbance has the frequencies $\omega_1$, $\omega_2$ and $\omega_3$ that need to be rejected. These frequencies $\omega_1$, $\omega_2$ and $\omega_3$ are in the range of 3E-3 [rad/sec] to 7E-3 [rad/sec]. In the frequency range of 3E-3 [rad/sec] to 7E-3 [rad/sec], the broken line has the maximum of gain and large variation of the phase, while the real line has a gentle increase with no maximization and a slight variation.

The plug-in disturbance-rejection controller 12 is designed by introducing the first to third attenuation coefficients $\zeta_1$, $\zeta_2$, and $\zeta_3$ so as to suppress the water-bed effect. Namely, the plug-in disturbance-rejection controller 12 is designed to avoid any excess increases of the gains at other frequencies than the specified frequencies including the frequencies $\omega_1$, $\omega_2$ and $\omega_3$ of the periodic disturbance. The first to third attenuation coefficients $\zeta_1$, $\zeta_2$, and $\zeta_3$ can be set, where in designing the plug-in disturbance-rejection controller 12, the first to third attenuation coefficients $\zeta_1$, $\zeta_2$, and $\zeta_3$ are updated so that the sensitivity function of the control system becomes the predetermined one.

Figure 8A:
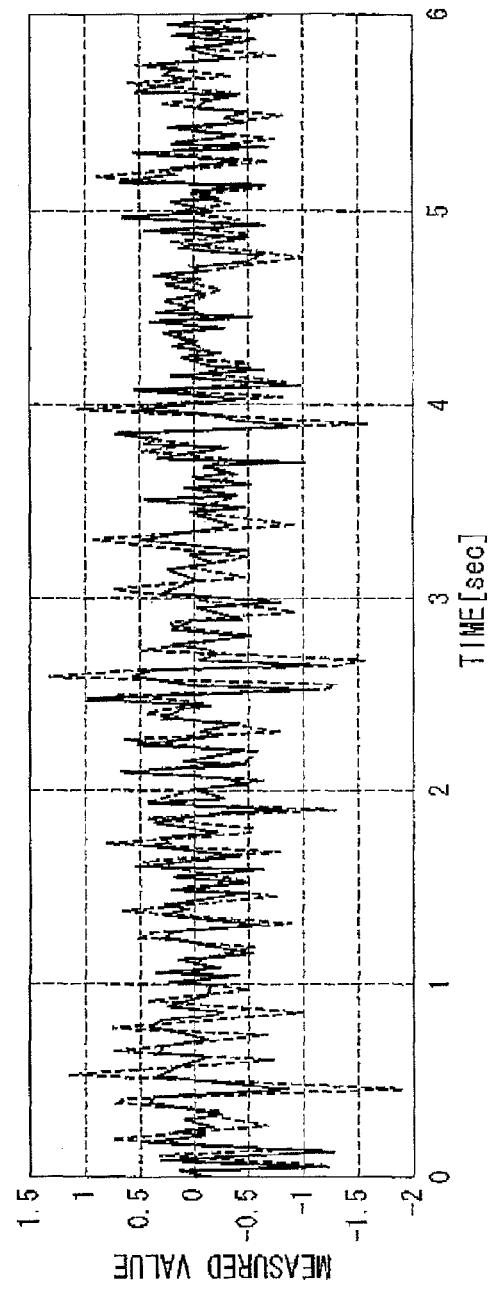
FIG. 8A is a diagram illustrating the simulation result of variation over time of a measured value at a point of the basis-weight profile as a control target for a paper machine shown in FIG. 5.
Figure 8B:
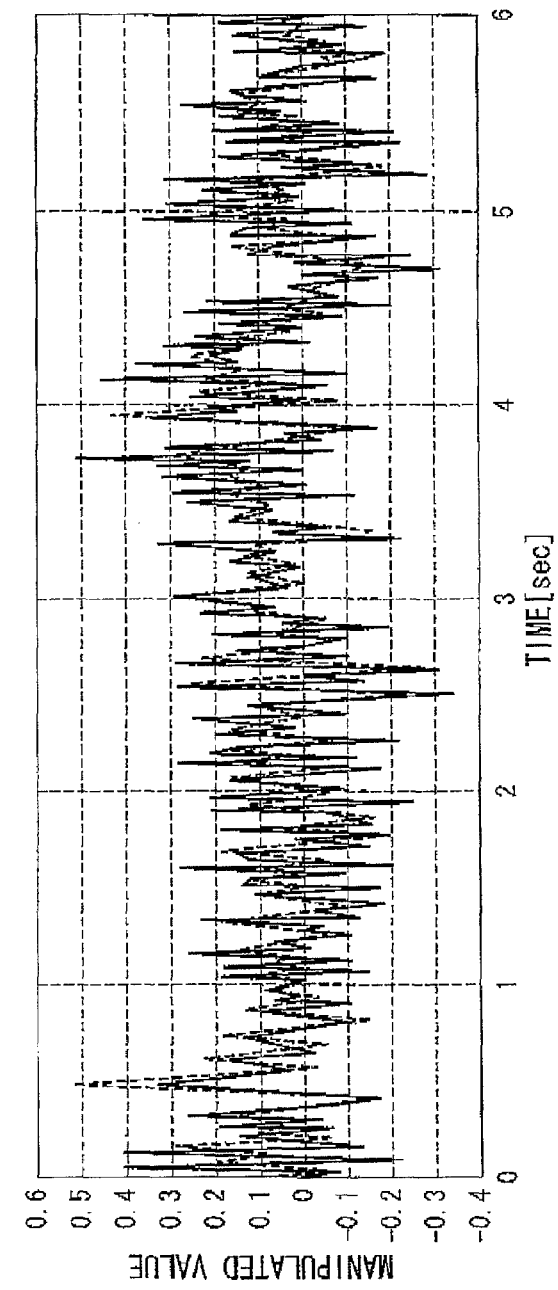
FIG. 8B is a diagram illustrating the simulation result of variation over time of the manipulated value (u-v) that is supplied as a control target to a paper machine shown in FIG. 5.

FIG. 8A is a diagram illustrating the simulation result of variation over time of the measured value "y" at a point of the basis-weight profile as the control target 30 for the paper machine 50 shown in FIG. 5. FIG. 8B is a diagram illustrating the simulation result of variation over time of the manipulated value (u-v) that is supplied as the control target 30 to the paper machine 50 shown in FIG. 5. In FIGS. 8A and 8B, the broken line represents the measured value "y" obtained by the control system including the control unit 11 and being free of the plug-in disturbance-rejection controller 12, and the real line represents the measured value "y" obtained by the control system including the control unit 11 and the plug-in disturbance-rejection controller 12.

With reference to FIG. 8A, the real line is smaller in amplitude than the broken line. The amplitude of the read line is approximately one half of the amplitude of the broken line. This can demonstrate that the disturbance is rejected by the manipulated value (u-v), thereby reducing the amplitude of the measured value "y" of the control target 30.

Figure 9:
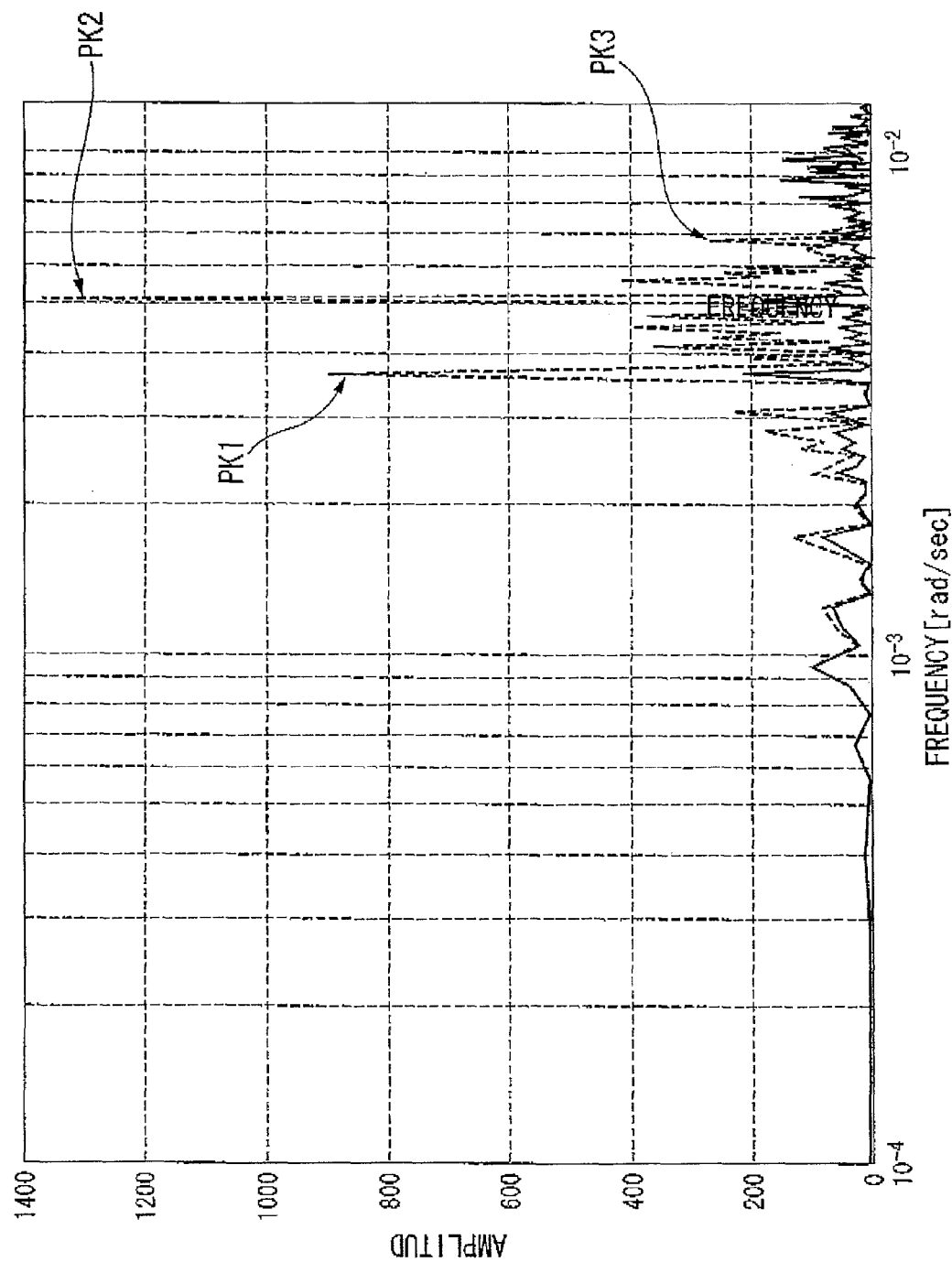
FIG. 9 is a diagram illustrating the simulation result of a frequency distribution of a measured value of a paper machine as a control target.
Figure 10:
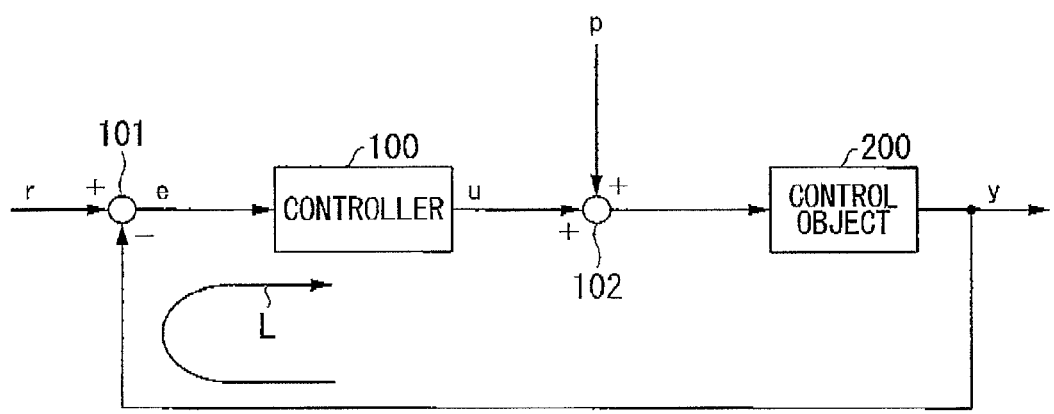
FIG. 10 is a block diagram illustrating the configuration of the conventional process control apparatus.

FIG. 9 is a diagram illustrating the simulation result of the frequency distribution of the measured value "y" of the paper machine 50 as the control target 30. In FIG. 9, the broken line represents the frequency distribution of the measured value "y" obtained by the control system including the control unit 11 and being free of the plug-in disturbance-rejection controller 12, and the real line represents the frequency distribution of the measured value "y" obtained by the control system including the control unit 11 and the plug-in disturbance-rejection controller 12. PK1 represents the main frequency component of the frequency $\omega_1$=0.0037 [rad/sec] (about 29 min. period). PK2 represents the main frequency component of the frequency $\omega_2$=0.0051 [rad/sec] (about 20 min period). PK3 represents the main frequency component of the frequency $\omega_3$=0.0068 [rad/sec] (about 15 min. period).

The broken line of FIG. 9 demonstrates that the periodic disturbance is present in the frequency range of 3E-3 [rad/sec] to 7F-3 [rad/sec]. The main frequency components PK1 and PK2 have remarkably larger amplitudes than those of other frequency components.

The real line of FIG. 9 demonstrates that the main frequency components PK1 and PK2 have remarkably reduced amplitudes, and the amplitudes of the frequency components including the main frequencies PK1, PK2, and PK3 are well reduced and suppressed in the frequency range of 3E-3 [rad/sec] to 7E-3 [rad/sec]. FIG. 9 demonstrates that the process control apparatus 1 or 2 including the plug-in disturbance-rejection controller 12 can control the paper machine 50 to reject the periodic disturbance efficiently.

The process control apparatus of this embodiment includes the plug-in disturbance-rejection controller 12 that is designed using the internal model principle. The plug-in disturbance-rejection controller 12 is added into the feedback loop that includes the control unit 11 thereby rejecting the disturbance efficiently. The attenuation coefficient $\omega$ is introduced to design the plug-in disturbance-rejection controller 12, thereby suppressing the water-bed effects.

Separating the plug-in disturbance-rejection controller 12 from the process control apparatus can realize the closed loop of the process control apparatus that is placed in the absence of disturbance before the plug-in disturbance-rejection controller 12 is introduced. There is no need to re-configure the feedback loop in order to switch between the presence and the absence of the disturbance if necessary.

As used herein, the following directional terms "forward, rearward, above, downward, vertical, horizontal, below, and transverse" as well as any other similar directional terms refer to those directions of an apparatus equipped with the present invention Accordingly, these terms, as utilized to describe the present invention should be interpreted relative to an apparatus equipped with the present invention.

The term "configured" or "designed" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as liming. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A process control apparatus comprising:
a controller that generates a first manipulated value based on a setting value and a measured value;
a plug-in disturbance-rejection controller that is designed by using parameters as in the following equation:

$$\begin{cases} J(z^{-1}) = J_x(z^{-1}) + J_y(z^{-1})Q(z^{-1}) \\ K(z^{-1}) = K_x(z^{-1}) + K_y(z^{-1})Q(z^{-1}) \end{cases}$$

wherein $J_x(z^{-1})=1$, $K_x(z^{-1})=0$, $J_y(z^{-1})=z^{-d}\overline{B}(z^{-1})S(z^{-1})$, $K_y(z^{-1})=-(S(z^{-1})\overline{A}(z^{-1})+z^{-d}R(z^{-1})\overline{B}(z^{-1}))$ and $Q(z^{-1})$ is a solution of the equation:

$$D_p(z^{-1})J'(z^{-1})-z^{-d}\overline{B}(z^{-1})S(z^{-1})Q(z^{-1})=1,$$

wherein $z^{-1}$ is a complex variable, d is a dead-time that is represented by a discrete time, J is a denominator polynomial of a discrete time model for the plug-in disturbance-rejection controller, $J_x$ is a design component of J, $J_y$ is another design component of J, K is a numerator polynomial of the discrete time model for the plug-in disturbance-rejection controller, is a design component of K, $K_y$ is another design component of K, O is a parameter polynomial that is to be computed, S is denominator polynomial of the discrete time model for a controller, R is a numerator polynomial of the discrete time model for the controller, $D_p$ is a denominator polynomial of the discrete time model for a disturbance generator, B is a numerator polynomial of the discrete time model combining a control target with a primary filter, $\overline{A}$ is a denominator polynomial of the discrete time model combining the control target with the primary filter, and J' is a polynomial excluding $D_p$ from the denominator polynomial of the plug-in disturbance-rejection controller;

the plug-in disturbance-rejection controller generating a second manipulated value;

a machine as a control object that receives the first manipulated value and the second manipulated value, the machine measuring a value of a tangible object and generating the measured value; and a primary filter that establishes a feedback loop, the primary filter receiving the measured value from the machine, the primary filter compensating for a frequency band in which a gain is increased due to waterbed effects that are caused by the plug-in disturbance-rejection controller, the primary filter feeding an output back to the controller, the primary filter supplying the output to the plug-in disturbance-rejection controller.

2. The process control apparatus according to claim 1, wherein the plug-in disturbance-rejection controller sets attenuation coefficients separately for main periodic components of a disturbance that is applied to the feedback loop, so as to suppress any excess increase of periodic components other than the main periodic components due to the waterbed effect.

3. The process control apparatus according to claim 1, wherein the plug-in disturbance-rejection controller rejects main periodic components of a disturbance that is applied to the feedback loop, the plug-in disturbance-rejection controller suppresses excess increase of periodic components other than the main periodic components due to waterbed effect.

4. The process control apparatus according to claim 1, further comprising:

a control parameter updating unit that updates a control parameter when variation of main periodic components of a disturbance is present, and the control parameter updating unit supplying the control parameter to the plug-in disturbance-rejection controller.

5. The process control apparatus according to claim 4, wherein the control parameter updating unit comprises:

a frequency analyzer unit performing frequency analysis of the measured value of the control target;

a storage unit sequentially storing analysis results by the frequency analyzer unit;

a determination unit comparing a new analysis result from the frequency analyzer unit to the previous analysis result that has been stored in the storage unit so as to determine the presence or absence of variation of main periodic components of a disturbance; and an updating unit that updates the control parameter in accordance with the new analysis result of the frequency analyzer unit when the determination unit determines the presence of variation of the main frequency component or components, the updating unit supplying the control parameter to the plug-in disturbance-rejection controller.

6. The process control apparatus according to claim 1, wherein the machine produces a sheet product as the tangible object, and the measured value is a profile in width of the sheet product.

* * * * *